(12) United States Patent
Oberländer et al.

(10) Patent No.: US 6,363,459 B1
(45) Date of Patent: Mar. 26, 2002

(54) MICROPROCESSOR DEVICE

(75) Inventors: Klaus Oberländer, Augsburg; Stefan Pfab, Grosshesselohe, both of (DE)

(73) Assignee: Infineon Technologies, Munich (DE)

( * ) Notice: Subject to any disclaimer, the term of this patent is extended or adjusted under 35 U.S.C. 154(b) by 0 days.

(21) Appl. No.: 09/221,782

(22) Filed: Dec. 28, 1998

Related U.S. Application Data

(63) Continuation of application No. PCT/DE97/01219, filed on Jun. 16, 1997.

(30) Foreign Application Priority Data

Jun. 25, 1996 (DE) .......................................... 196 25 399
Jun. 26, 1996 (DE) .......................................... 196 25 627

(51) Int. Cl.⁷ .......................................... G06F 12/00
(52) U.S. Cl. ...................................................... 711/154
(58) Field of Search ................................ 711/105, 154, 711/163, 153

(56) References Cited

U.S. PATENT DOCUMENTS

| 5,317,750 | A | | 5/1994 | Wickersheim et al. |
| 5,450,552 | A | | 9/1995 | Michino |
| 5,588,133 | A | * | 12/1996 | Yoshida et al. ............. 711/154 |
| 5,590,306 | A | * | 12/1996 | Watanabe et al. ........... 711/154 |

FOREIGN PATENT DOCUMENTS

EP 0 700 002 A1 3/1996

OTHER PUBLICATIONS

Published International Application WO96/08775 A1 (Roy et al.), dated Mar. 21, 1996.

* cited by examiner

*Primary Examiner*—Matthew Kim
*Assistant Examiner*—Christian P. Chace
(74) *Attorney, Agent, or Firm*—Herbert L. Lerner; Laurence A. Greenberg; Werner H. Stemer

(57) ABSTRACT

The microprocessor device has a central processing unit in which the instructions that are stored in a program memory are converted into arithmetic or logical combinations for controlling the different components of the microprocessor. A data and/or control line bus enables data transfer and access to CPU-internal and/or peripheral-bound special function registers, which are assigned to the central processing unit. A coherent memory block with memory cells of the random access type is assigned to the central processing unit through the data and/or control line bus. The memory block has a dedicated address decoder and bus driver circuit, and has a first, arbitrarily usable and/or accessible memory area and a second, peripheral-independent and directly addressable memory area. The memory block is assigned an enable device which disables or enables the output of data contents from the second memory area onto the data and/or control line bus.

12 Claims, 3 Drawing Sheets

MICROPROCESSOR DEVICE

CROSS-REFERENCE TO RELATED APPLICATION

This is a continuation of copending international application PCT/DE97/01219, filed Jun. 16, 1997, which designated the United States.

BACKGROUND OF THE INVENTION

1. Field of the Invention

The invention relates to a microprocessor device having an arithmetic logic unit or central processing unit (CPU) in which the instructions, which are stored in a program memory, for controlling the different components of the microprocessor are converted into arithmetic and/or logical combinations, and having a data and/or control line bus for the transmission of data and for access to CPU-internal and/or peripheral-bound special function registers, which are assigned to the central processing unit.

A multiplicity of microprocessors and microcontrollers are known in the prior art, for example those from the so-called 8051 family of Siemens. The control computer 8051, which was originally developed by Intel Corporation and in the meantime has also become available from other companies in similar forms, has developed in recent years to become one of the standards in the world of 8-bit microcontrollers. The heart of such a microprocessor system is the central processing unit (CPU), which is designed as part of a semiconductor chip on which the other parts of the system are also concomitantly integrated. The CPU essentially consists of three components: an instruction decoder, a central processing unit and an associated sequence controller. In the instruction decoder, the instructions which have been read in from the on-chip or off-chip program memory are decoded and the steps necessary for execution are performed. These comprise various measures, for example fetching further data from the memory, or instructing the central processing unit to carry out specific arithmetic or logical combinations, or causing the sequence controller to jump to a different program location, and the like. The instruction decoder passes the instructions on to the different CPU components by means of numerous internal control signals. The instruction decoder decodes a specific instruction set, that is to say the binary machine instructions of the respective CPU. The logical and arithmetic combinations which the instruction decoder requires in order to process a specific instruction are carried out in the central processing unit or the CPU. The central processing unit with a, for example, 8051-compatible CPU essentially knows addition, subtraction, multiplication, division, as well as the logic combinations AND, OR, EXCLUSIVE-OR, ONE'S COMPLEMENT.

The fundamental method of operation and the structure of such a microcontroller 8051 are known and will not be explained here in every detail. For further details on the architecture and programming of the prior art microprocessor system, reference is therefore expressly made to the entire contents of the following manual: Johannis, Rainer, Handbuch zum 80C517 und 80C517A, Architektur und Programmierung [Manual on the 80C517 and 80C517A, Architecture and Programming], Rainer Johannis and Nikolaos Papadopulus, Siemens Aktiengesellschaft, Berlin, Munich, ISDN 3-8009-4128-7.

Only those components of the previously known microcontroller and its RAM memory division which are essential for an understanding of the invention are explained below, with reference to FIGS. 1 and 4. In accordance with FIG. 1, in the architecture of the microcontroller 8051 (or ECO2000), the internal RAM memory area 1 having an address field of 256 bytes, for example, is subdivided into three sections 2, 3, 4. The first section 2 comprises the "lower" 128 bytes and is both directly and indirectly addressable (00H to 7FH). Also located in this section 2 are the four register banks 5, 6, 7, 8 each having eight registers of 8 bits (00H to 1FH), as well as an area 9 having 16 bit-addressable bytes (20H to 2FH). The second section 3 of the internal RAM memory 1 comprises the "upper" 128 bytes (80H to FFH). The upper 128 bytes are only indirectly addressable. Although a third section 4 has the same address range as the second section 3, it is only directly addressable. It also contains 16 bytes, namely at all addresses divisible by eight, whose bits are likewise bit-addressable. This area 4 constitutes the so-called special function registers (SFR). This means that the registers of the section 4 are not located in a coherent area, but rather are assigned to the corresponding peripheral components of the microprocessor (timer, UART, interrupt module, co-processor, I/O port and the like). The internal special function registers of the CPU (A, B, Dptr, stack pointer and the like) are also located in this area 4. In this respect, FIG. 4 shows a diagrammatic illustration of the RAM memory division used to date in 8051 microprocessors. It illustrates the special function registers 12, 13, 14, 15, 16, 17 of the the peripheral components of the microprocessor, as well as the CPU-internal special function register 18, the indirectly addressable RAM area 19, the indirectly and directly addressable RAM area 20, as well as the further internal special function registers 21 of the CPU concerning the A register, B register, DPTRH register, DPTRL register, SP register, DPSEL register and the like. The reference numbers 22 and 23 represent the special function registers EETIME and EEVOLT, which are also referred to below as peripheral-independent special function registers, are realized as individual registers and are each connected separately to the data bus 11 and driven via control lines 10.

Such a configuration serves the purpose of permitting the fastest and most effective access possible by the CPU to the peripheral components of the microprocessor. Particularly in the case of smart cards, the situation arises where the third memory area 4 illustrated in FIG. 1 is utilized only very scantily, since only very few peripheral components are used, as a rule, in smart card products. This means that, in spite of intrinsically good software support by the 8051 (or ECO2000) instructions which relate to this third memory section 4–39 and 49 of a total of 125 and 187 8051 instructions and ECO2000 instructions, respectively, have a direct address as source or destination—the memory area 4 is virtually wasted. At the same time, however, it is precisely instructions with direct addressing that are usually quite fast and do not require too many bytes, particularly in comparison with the alternative use of a so-called external RAM memory (XRAM), to which, as a rule, access can be made only in a very unfavorable manner with an 8051 architecture. This also applies to the instruction set of the ECO2000, which constitutes a further development of the ECO51 (8051) with a supplemented instruction set, in the case of which the connection of the XRAM memory actually acquired great importance. Nevertheless, such instructions still require slightly more bytes, but above all, in addition, more clock pulses than comparable instructions with direct addresses. Since, however, particularly in smart card applications, the area requirement is of the greatest importance, and the internal RAM memory areas 2 and 3 are almost completely utilized for previous used operating systems, this problem can be circumvented in the sense of the solutions used to date only by means of additional direct addresses in the unutilized area 4 or, in the case of a larger requirement, by means of an XRAM memory which is additionally to be provided. In the previous solution there were admittedly experiments with a plurality of individual special function registers 22, 23 which were placed in this unutilized area 4 but were not employed in a manner corresponding to the purpose of the area, that is to say as special function registers bound to peripheral components, but rather were used as a pure RAM expansion. However, these registers 22, 23 were realized only in small associated groups (for example EETIME, EEVOLT) or as individual registers, as has been explained with reference to the diagrammatic illustration in accordance with FIG. 4. In this case, each individual register or each small group of registers was connected separately to the data bus 11 and supplied, via the control lines 10 (or via four bus status lines in the case of the ECO2000), with the information currently residing on the data bus 11. Each individual register 22, 23 or each individual small group had, however, a dedicated interface circuit, that is to say a dedicated address decoder and bus driver. With regard to the considerable area requirement and the comparatively large circuitry outlay, this solution proved to be very unfavorable, particularly in smart card applications.

SUMMARY OF THE INVENTION

It is accordingly an object of the invention to provide a microprocessor device, which overcomes the above-mentioned disadvantages of the heretofore-known devices and methods of this general type and which provides a RAM memory device that optimizes microprocessors based on the 8051 memory model with regard to the RAM memory utilization in conjunction with the smallest possible current consumption and circuitry outlay.

With the foregoing and other objects in view there is provided, in accordance with the invention, a microprocessor device, comprising:

a central processing unit for converting instructions stored in a program memory into arithmetic and/or logical combinations for controlling various components of the microprocessor device;

a data and/or control line bus connected to the central processing unit for transmitting data and for selectively accessing CPU-internal and peripheral-bound special function registers associated with the central processing unit;

a coherent memory block random access type memory cells connected to the central processing unit through the data and/or control line bus, the memory block including a dedicated address decoder and bus driver circuit, and having a first, arbitrarily accessible memory area and a second, peripheral-independent and directly addressable memory area; and an enable device connected to the memory block for selectively disabling and enabling an output of data contents from the second memory area onto the data and/or control line bus.

In other words, a coherent SFR RAM memory block having memory cells of the random access type (RAM) is assigned to the central processing unit by means of the data and/or control line bus. The memory block has a dedicated address decoder and bus driver circuit, and has a first, arbitrarily usable and/or accessible memory area and a second, peripheral-independent and directly addressable memory area. The memory block is assigned an enable device which disables or enables the output of data contents from the second memory area onto the data and/or control line bus.

The solution according to the invention for the first time utilizes the resources of this RAM memory area which has been utilized scantily to date above all in the case of smart cards, to be precise not with the intention of connecting peripheral components of the microprocessor by placing their interfaces in this memory area, but rather, in particular, with the intention of gaining additional space in the RAM memory in this way. Status values can now be stored in this memory area, which status values collide in the RAM memory per se with other areas such as stack, register banks and the bit-addressable area. According to the invention, this is done by arranging an independent, third RAM memory area, which is also referred to as special function (SFR) RAM memory or simply as "memory block" and which contains a complete block of addresses (for example 64 or all possible 128 addresses) as well as merely a (single) address decoder and a (single) bus driver, and in this way can be connected as an external block via the data bus and the control lines (in the case of an ECO2000: bus status lines) to the CPU. In contrast to the previously known measure using an external RAM memory (XRAM), which, on account of its properties which are optimized towards greater data widths (for example 16 bits), with regard to a maximum storage capacity, generally requires a significantly greater addressing outlay in terms of circuitry, the memory area according to the invention can be utilized significantly more favorably than in the case of an XRAM memory as a result of the effective instruction support of the 8051 (or ECO2000) microprocessor. In summary, the solution according to the invention, with the coherent RAM memory block, has the following advantageous properties:

1. It is disposed externally of the CPU and can thus be configured, in principle, like any other peripheral component of the microprocessor and be arranged at any desired point in the layout plan of the microprocessor.
2. It can assume any different sizes depending on the desired requirement with regard to the status registers.
3. It is more compact than a plurality of individual status function registers (which are assigned to no peripheral components).
4. It consumes less power.
5. It makes better use of the favorable software support of the 8051 (ECO2000) microprocessor for direct addresses; and
6. It clears the "normal" RAM memory (in favor of stack, registers, bit-addressable bytes and the like) of pure "status registers."

Since special function registers of the CPU or of the peripheral components (timer, UART, interrupt module, co-processor, I/O port and the like) continue to be located in the third RAM memory area, or the memory block, according to the invention, it is necessary to provide a suitable measure for preventing the RAM SFR memory block from driving data contents onto the data bus at addresses of these "real" special function registers. For this purpose, the memory block is assigned an enable device, which disables or enables the output of data contents from the second memory area onto the data and/or control line bus.

In accordance with an added feature of the invention, the enable device includes an OR gate circuit having inputs connected, via activation lines, to individual the peripheral-bound special function registers, and having an output coupled to the memory block for selectively disabling and enabling the second memory area. In this configuration, the SFR RAM memory block has a disable input to which a signal can be applied which represents an "ORing" of all the signals which indicates whether a peripheral component or the CPU senses that it is addressed via a direct address at a specific instant. This configuration ensures that the SFR RAM memory block does not have to be adapted for each new product in dependence on the user-oriented specifications, for instance because a specific peripheral component is added or omitted, or its address is changed, rather it suffices completely merely to disconnect or add the activation line of the corresponding peripheral component from or to, respectively, the ORing at the disable input of the SFR RAM memory block. In the event of address changes of the special function registers of the respective peripheral components, nothing is changed here with regard to the ORing, since the activation signal automatically appears on the corresponding activation line of the peripheral component in the case of a different address.

In accordance with an additional feature of the invention, the enable device includes a plurality of enable memory cells arranged within the coherent memory block, the enable memory cells being assigned to a predetermined group of memory cells of the second, peripheral-independent and directly addressable memory area, and selectively disabling and enabling the output of the data contents of the memory cells of the second memory area onto the data and/or control line bus in dependence on a memory state of one of the enable memory cells.

In this case, the enable memory cells of the enable device constitute, in particular, programmable memory cells of the read-only memory type, for instance of the ROM or EEPROM type. This design affords the advantage of already defining the data content of the enable memory cells during production, by means of a mask in which the data contents which are stored correspondingly in a file are allocated. In this way, it is possible, as in the case of the read-only memory (ROM) which is known per se, for specific contacts to be omitted in the case of predetermined enable memory cells, in order to define the desired data state. In the case of the SFR RAM memory block, it is the function, rather than the content, that one wishes to influence, that is to say one wishes to prevent the SFR RAM memory block from driving onto the data bus in the case of already allocated "real" SFR addresses. A supposedly natural solution would therefore be simply to design the RAM memory cells such that the contacts of these superfluous (therefore harmful) RAM memory cells to the bit lines are omitted. However, the present problem cannot be solved in this way. Specifically, in the case of reading the correspondingly selected bit line of the memory block "floated", which is extremely undesirable and which, moreover, does not prevent the driver circuits of the RAM memory from nevertheless driving this stochastic "value" onto the data bus. This is circumvented by the above-mentioned embodiment by virtue of the fact that an additional bit or an enable memory cell, which indicates whether or not the output drivers are to drive the value onto the data bus, is introduced for a predetermined group, in particular each byte of the RAM memory. In the case of a word length or byte length of eight bits for a predetermined group, this additional bit may be a ninth ROM bit. Consequently, this bit can already be defined during production, by means of a "ROM mask", and requires, for example, just one transistor, whose line state is defined. Since, however, the word select line, which selects the corresponding byte, simultaneously selects the eight "normal" RAM memory cells of the byte and this additional enable transistor of the enable memory cell, it may be provided that the data to be read out are firstly buffered in a buffer (latch) and only subsequently are driven onto the data bus. Otherwise, undesirable parallel-path currents may be produced, at least momentarily, until the line which is defined by the enable bit has settled. This can be prevented by means of a buffer, since in this case the enable bit of the buffer is already at the correct value at the instant of reading and can switch off the drivers of the "normal" eight bits. As a result, however, at least one clock phase is lost during reading access. During writing access, this disadvantage is unimportant if a "superfluous" byte is written in the SFR RAM memory, as long as this value is not read out at a later instant.

In accordance with another feature of the invention, the enable device is hard-wired for defining a control of the data output from one of the first and the second memory area of the memory block.

In accordance with a further feature of the invention, the enable device is hard-wired for defining a control of the data output from one of the first and the second memory area of the memory block.

In accordance with again a further feature of the invention, the enable memory cells of the enable device are programmable memory cells of the read-only memory type.

In accordance with again an added feature of the invention, the coherent memory block is spatially separate from the central processing unit.

In accordance with again an additional feature of the invention, the coherent memory block is a RAM-type semiconductor memory, preferably a static RAM memory.

In accordance with a concomitant feature of the invention, the coherent memory block has an address field of 8 bits by 256 bits.

Undesirable parallel-path currents can be prevented by precharging the enable line to an inactive state, in order that driving onto the data bus is prevented at the beginning of the read cycle. If a "superfluous" byte (in other words one which is already realized in a peripheral component) is then addressed, this value is preserved (the driver of the SFR RAM memory remains inactive). Otherwise the enable bit pulls the line to the active state, that is to say the drivers switch the value of the remaining eight bits through to the data bus. Here, too, a small temporal disadvantage is accepted, since it takes slightly more time firstly to activate the drivers during a reading operation instead of opening them as a default. However, this disadvantage is in this case only of the order of magnitude of gate transit times.

In summary, the advantages in designing the enable device using additional, fixed-programmable enable memory cells are as follows:

1. Irrespective of user-oriented special features, the structure of the SFR RAM memory block on the part of the manufacturer always remains the same, that is to say its layout remains unchanged.
2. No additional hardware components are necessary outside the SFR RAM memory block.
3. No additional lines are required from the peripheral components and the CPU to the SFR RAM memory block, as a result of which the area requirement can be reduced.
4. The procedure of generating different functions by means of a ROM transistor has been sufficiently tried and tested.

With the above and other objects in view there is also provided, in accordance with the invention, a smart card (chip card), comprising a smart card body and the above-described microprocessor device disposed in the smart card body.

Other features which are considered as characteristic for the invention are set forth in the appended claims.

Although the invention is illustrated and described herein as embodied in a microprocessor device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
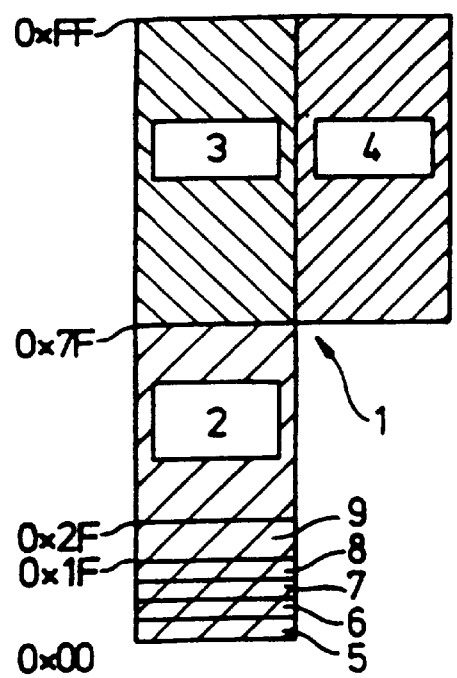
FIG. 1 is a diagram explaining the address ranges of the internal IRAM memory and of the external special function registers in a typical 8051 (or ECO2000) architecture.
Figure 2:
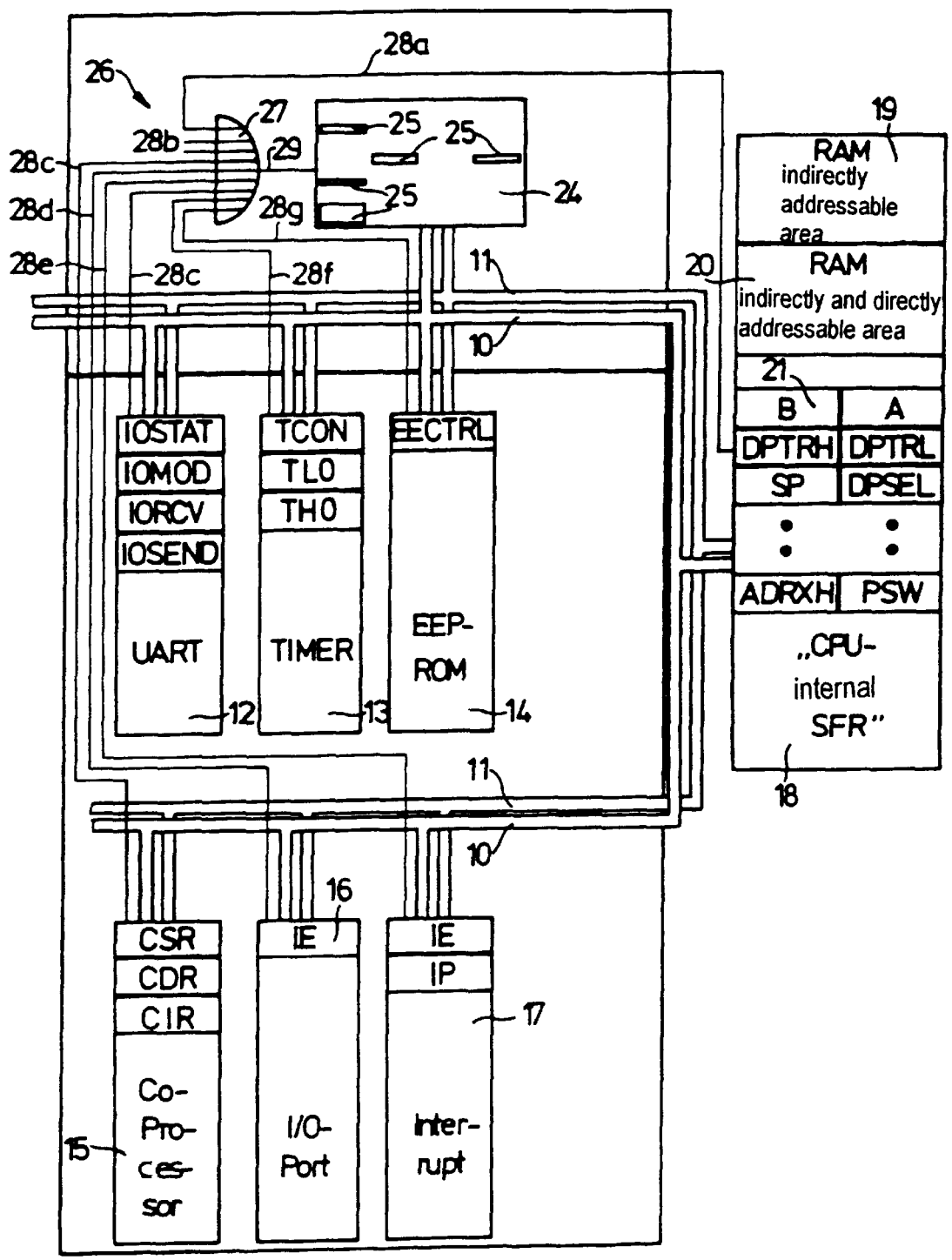
FIG. 2 is a schematic diagram of the RAM memory division with a coherent SFR RAM memory block in accordance with a first exemplary embodiment of the invention.
Figure 4:
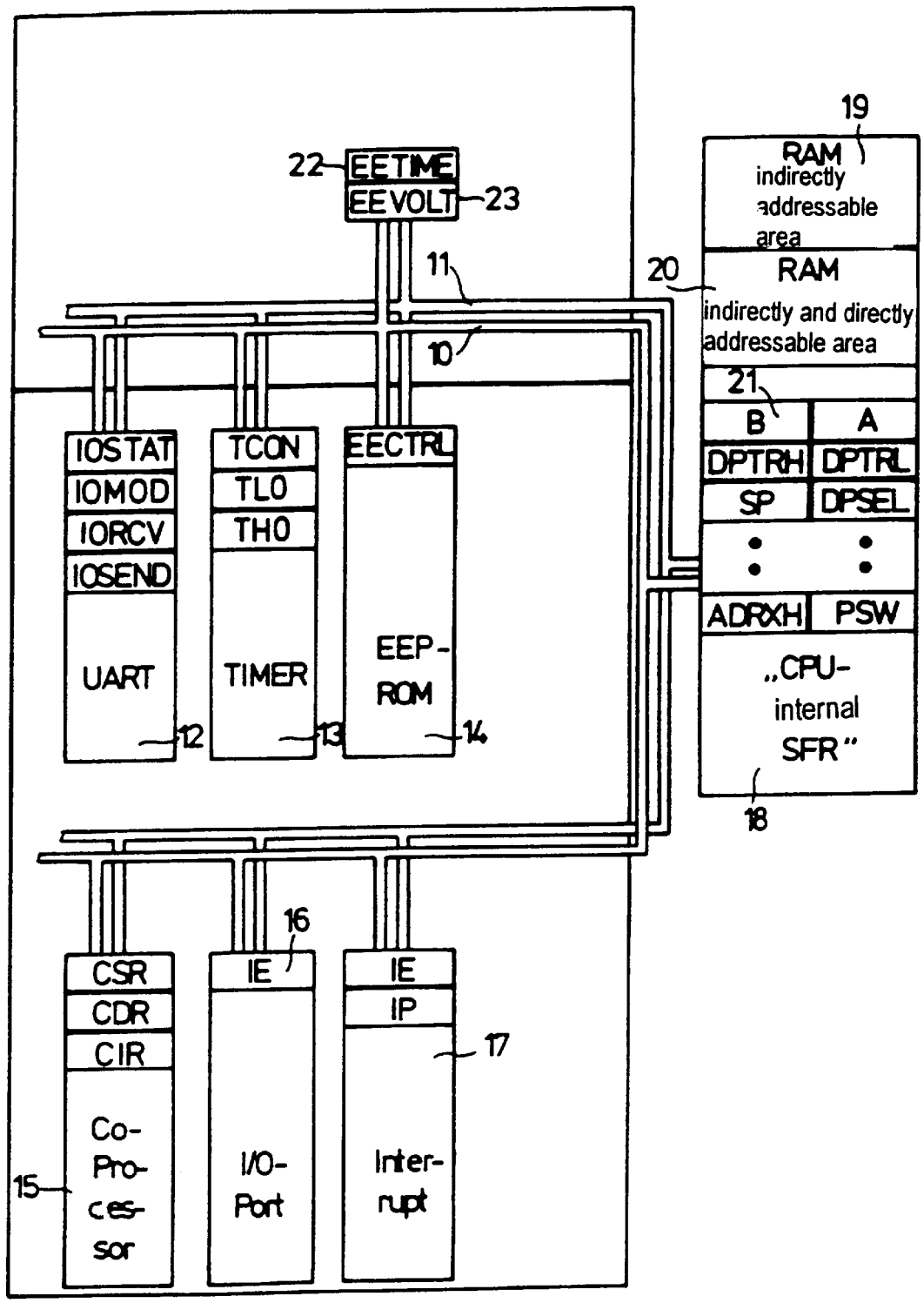
FIG. 4 is a diagram of a RAM memory division used to date in 8051 microprocessors.

Referring now to the illustration of the invention in detail and first, particularly, to the first exemplary embodiment of FIG. 2 thereof, the components identified with the reference numerals 10 to 21 designate exactly the same components as in the illustration of the above-described FIG. 4. Accordingly, reference is herewith had to the description of FIG. 4 appearing in the introduction. The division of the address ranges is, furthermore, the same as that corresponding to the illustration according to FIG. 1. The inventive embodiment according to FIG. 2 consequently differs in terms of circuitry in that, instead of the plurality of individual special function registers 22, 23, there is assigned a coherent SFR RAM memory block 24, which is assigned to the central processing unit by means of the data and/or control line bus 10, 11, has memory cells of the random access type (RAM), has a (single) address decoder and bus driver circuit and has a first, arbitrarily usable and/or accessible memory area and a second, peripheral-independent and directly addressable memory area 25. The SFR RAM memory block 24 is in this case assigned an enable device 26 having an OR gate 27, which disables or enables the output of data contents from the second memory area 25 onto the data and/or control line bus 10, 11. The inputs of the OR gate circuit 27 are connected to activation lines 28a to 28g, which lead to the individual peripheral-bound special function registers 12, 13, 14, 15, 16, 17, 21, and the output of the said OR gate circuit is coupled via a disable line 29 for disabling or enabling the second memory area 25.

The values which are stored in the memory block 24 are illustrated in the table below, the allocated values being assigned to the second memory area 25 of the memory block 24, and the values which are left open being freely available as desired:

| Special Function Registers In Hexadecimal Sequence | |
|---|---|
| Address | Special Function Register |
| 80H | |
| 81H | Stack Pointer |
| 82H | DPL (⅛; DSEL!) |
| 83H | DPH (⅛; DSEL!) |
| 84H | DPTXL (⅛; DPSEL!) |
| 85H | DPTXH (⅛; DPSEL!) |
| 86H | DPSEL |
| 87H | |
| 88H | TCON |
| 89H | |
| 8AH | TLO |
| 8BH | THO |
| 8CH | |
| 8DH | |
| 8EH | |
| 8FH | |
| 90H | IOPORT |
| 91H | |
| 91H | |
| 93H | |
| 94H | |
| 95H | |
| 96H | |
| 97H | |
| 98H | IOSTAT |
| 99H | IOMOD |
| 9AH | IORCV |
| 9BH | IOSEND |
| 9CH | |
| 9DH | |
| 9EH | |
| 9FH | |
| A0H | ADRXH |
| A1H | |
| A2H | |
| A3H | |
| A4H | |
| A5H | |
| A6H | |
| A7H | |
| A8H | IE |
| A9H | |
| AAH | |
| ABH | |
| ACH | |
| ADH | |
| AEH | |
| AFH | |
| B0H | EIOSTAT |
| B1H | EIOMOD |
| B2H | EIORCV |
| B3H | EIOSEND |
| B4H | |
| B5H | |
| B6H | |
| B7H | |
| B8H | IP |
| B9H | |
| BAH | |
| BBH | |
| BCH | |
| BDH | |
| BEH | |
| BFH | |
| C0H | |
| C1H | |
| C2H | |
| C3H | |
| C4H | |
| C5H | |
| C6H | |
| C7H | |
| C8H | |
| C9H | |
| CAH | |

-continued

| Special Function Registers In Hexadecimal Sequence | |
|---|---|
| Address | Special Function Register |
| CBH | |
| CDH | |
| CEH | |
| CFH | |
| D0H | PSW |
| D1H | |
| D2H | |
| D3H | |
| D4H | |
| D5H | |
| D6H | |
| D7H | |
| D8H | EECTRL |
| D9H | |
| DAH | |
| DBH | |
| DCH | |
| DEH | |
| DFH | |
| E0H | ACC |
| E1H | |
| E2H | |
| E3H | |
| E4H | |
| E5H | |
| E6H | |
| E7H | |
| E8H | CSR |
| E9H | CDR |
| EAH | CIR |
| EBH | |
| ECH | |
| EDH | |
| EEH | |
| EFH | |
| F0H | B |
| F1H | |
| F2H | |
| F3H | |
| F4H | |
| F5H | |
| F6H | |
| F7H | |
| F8H | CONFIGP |
| F9H | XRSIZE |
| FAH | EESIZE |
| FBH | EEPAGE |
| FCH | EETIME |
| FDH | EEVOLT |
| FEH | ROMSIZE |
| FFH | |

Figure 3:
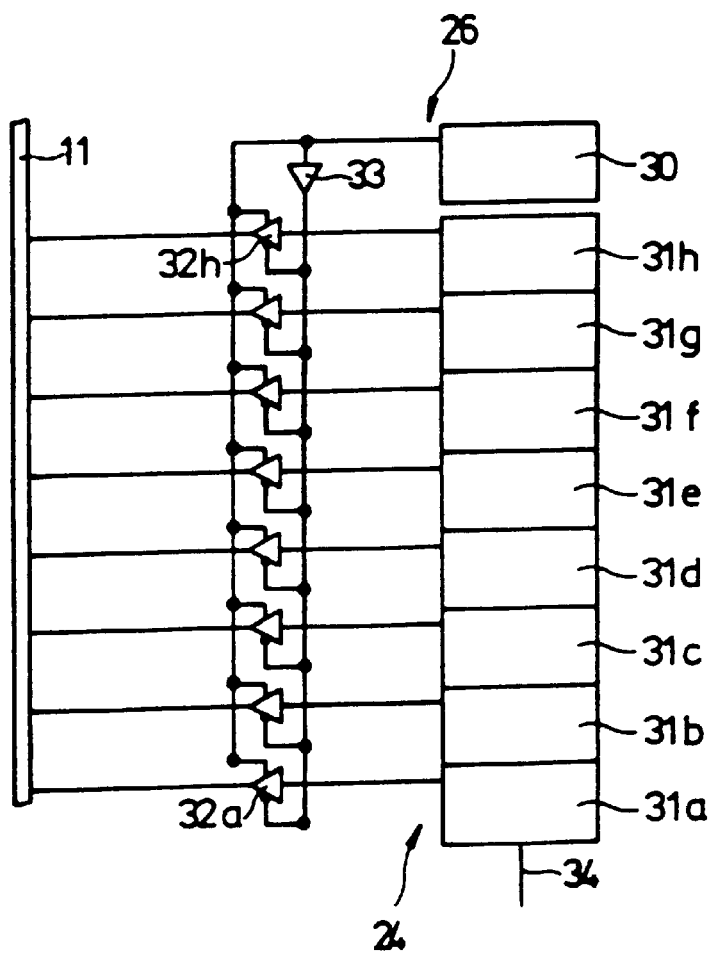
FIG. 3 is a schematic diagram of an SFR RAM byte of the memory block in accordance with a further exemplary embodiment of the invention.

With reference to FIG. 3, there is shown a second exemplary embodiment of the invention, in which the enable device 26 has enable memory cells which are arranged within the coherent SFR RAM memory block 24 and are each assigned to a predetermined group of memory cells of the second, peripheral-independent and directly addressable memory area. The illustration according to FIG. 3 illustrates only one byte with eight ROM memory cells 31*a* to 31*h*, to which an additional, ninth bit of an enable memory cell 30 is assigned. This additional, ninth bit controls, via a driver circuit 33, the output of the data contents of the memory cells 31*a* to 31*h* onto the bus driver 32*a* to 32*h* and thus onto the data bus 11 as a function of the stored state of the enable memory cell 30 in the sense of disabling or enabling. The reference number 34 identifies the word select line for selection of the byte with the memory cells 30, and 31*a* to 31*h*.

We claim:

1. A microprocessor device, comprising:
   a central processing unit for converting instructions stored in a program memory into arithmetic and/or logical combinations for controlling various components of the microprocessor device;
   a data and/or control line bus connected to said central processing unit for transmitting data and for selectively accessing CPU-internal and peripheral-bound special function registers associated with said central processing unit;
   a coherent memory block random access type memory cells connected to said central processing unit through said data and/or control line bus, said memory block including a dedicated address decoder and bus driver circuit, and having a first, arbitrarily accessible memory area and a second, peripheral-independent and directly addressable memory area; and
   an enable device connected to said memory block for selectively disabling and enabling an output of data contents from said second memory area onto said data and/or control line bus.

2. The microprocessor device according to claim 1, wherein said enable device includes an OR gate circuit having inputs connected, via activation lines, to individual said peripheral-bound special function registers, and having an output coupled to said memory block for selectively disabling and enabling said second memory area.

3. The microprocessor device according to claim 1, wherein said enable device includes a plurality of enable memory cells arranged within said coherent memory block, said enable memory cells being assigned to a predetermined group of memory cells of said second, peripheral-independent and directly addressable memory area, and selectively disabling and enabling the output of the data contents of the memory cells of said second memory area onto said data and/or control line bus in dependence on a memory state of one of said enable memory cells.

4. The microprocessor device according to claim 3, wherein said enable device is hard-wired for defining a control of the data output from one of said first and said second memory area of said memory block.

5. The microprocessor device according to claim 2, wherein said enable device is hard-wired for defining a control of the data output from one of said first and said second memory area of said memory block.

6. The microprocessor device according to claim 3, wherein said enable memory cells of said enable device are programmable memory cells of the read-only memory type.

7. The microprocessor device according to claim 4, wherein said enable memory cell s of said enable device are programmable memory cells of the read-only memory type.

8. The microprocessor device according to claim 1, wherein said coherent memory block is spatially separate from said central processing unit.

9. The microprocessor device according to claim 1, wherein said coherent memory block is a RAM-type semiconductor memory.

10. The microprocessor device according to claim 1, wherein said coherent memory block is an SRAM-type semiconductor memory.

11. The microprocessor device according to claim 1, wherein said coherent memory block has an address field of 8 bits by 256 bits.

12. A smart card, comprising a smart card body and the microprocessor device according to claim 1 disposed in said smart card body.

* * * * *

UNITED STATES PATENT AND TRADEMARK OFFICE
CERTIFICATE OF CORRECTION

PATENT NO.   : 6,363,459 B1  Page 1 of 1
DATED        : March 26, 2002
INVENTOR(S)  : Klaus Oberländer et al.

It is certified that error appears in the above-identified patent and that said Letters Patent is hereby corrected as shown below:

<u>Title page,</u>
Item [30], should read as follows:

-- Jun. 26, 1996      (DE)  ……….. 196 25 627 --

Signed and Sealed this

Twentieth Day of August, 2002

Attest:

JAMES E. ROGAN
*Attesting Officer*   *Director of the United States Patent and Trademark Office*